March 6, 1951  J. A. LENTZ  2,544,097
PARALLELOMETER CHUCK
Filed Aug. 5, 1946
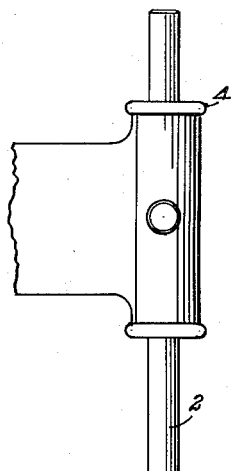
FIG. 2.
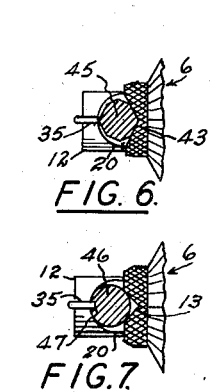
FIG. 6.
FIG. 7.
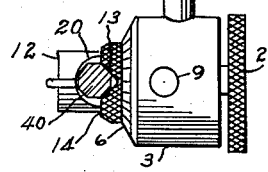
FIG. 5.
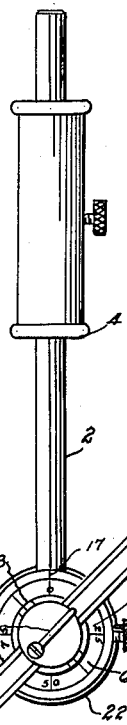
FIG. 1.
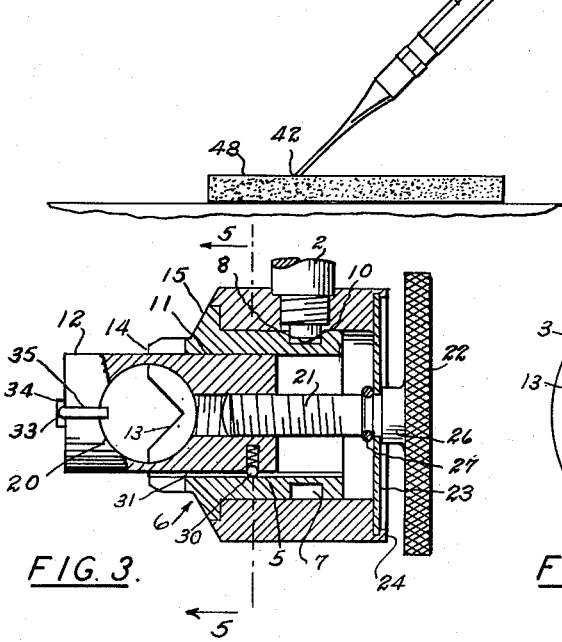
FIG. 3.
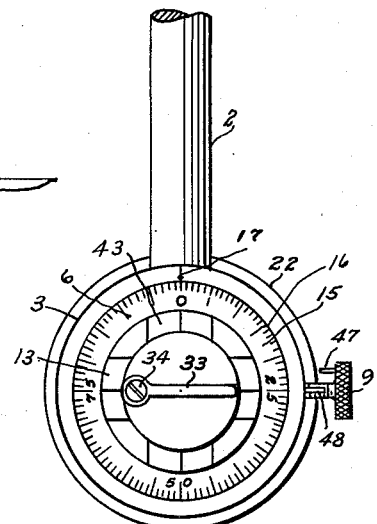
FIG. 4.
INVENTOR.
John A Lentz
BY Scott L. Norvell
attorney Patented Mar. 6, 1951 2,544,097

UNITED STATES PATENT OFFICE 2,544,097

PARALLELOMETER CHUCK

John A. Lentz, Phoenix, Ariz.

Application August 5, 1946, Serial No. 688,479

6 Claims. (Cl. 51—218)

This invention pertains to chucks for holding dental instruments in a parallelometer such as described in my Patent No. 1,546,667. I have determined that practically all types of dental cutting instruments such as scalers, chisels, hatchets, and the like, can be sharpened on the parallelometer by placing a grinding stone on the base table and by holding the instrument in a chuck attached to the operative arm. By adjusting the instrument rotatively on its axis and varying the angle of the handle shaft relative to the face of the stone, all beveled surfaces to be sharpened can be worked on the stone. To facilitate rotative positioning of octagonal handled instruments a chuck should be provided which will hold the handle with either a flat or an angle edge in definite relation to the parallelometer shaft. Round handled instruments should have a groove or hole formed along the handle in definite relation to the cutting edges to be sharpened. Indicia can be marked on the instrument handles from which the correct setting and chucking positions can be quickly determined.

In view of the foregoing:

One of the objects of my invention is to provide a chuck which when secured in the parallelometer will hold the handles of various types of cutting instruments in predetermined or selected positions axially and angularly relative to the plane of the base of the parallelometer.

A second object is to provide an instrument holding chuck adapted for use on a parallelometer which will hold the instrument in various positions for sharpening its cutting edge; the chuck being arranged to hold octagonal handled instruments by engaging either adjacent flat surfaces or by engaging angularly disposed flat surfaces separated by a contiguous flat surface, and being further arranged to hold round handled instruments in any predetermined position as determined by a groove in said instrument handle.

A third object is to provide a chuck, as above mentioned, adapted to indicate the angular position of the axis of an instrument held therein in relation to the plane of the parallelometer base;

A fourth object is to provide a chuck having a stem adapted for attachment in the mobile arm of a parallelometer, a cylindrical case attached to the bottom of said stem, an instrument positioning thimble adapted to rotative adjustment in said case, and a gripping nose piece cooperative with a thumb screw adapted to resiliently secure said instrument handle against said positioning thimble; and A fifth object is to provide said thimble with a scale readable relative to a reference mark on said case and a frictional engagement between said case and said thimble so that it may be retained at desired rotative positions within said case while the nose piece is brought to bear on an instrument handle, together with further locking means between said thimble and said case.

Other objects will appear hereinafter.

I attain the foregoing objects by means of the devices and mechanism shown in the accompanying drawings, in which:

Figure 1 is a front elevation of my chuck and attendant parts with an instrument held at a sharpening angle;

Figure 2, a side elevation thereof with the nose piece and thimble rotated somewhat to better show construction;

Figure 3 is a vertical section of the chuck body as shown in Fig. 2 and drawn on a somewhat enlarged scale;

Figure 4 is a front elevational view of the chuck body, as shown in Fig. 1, drawn on an enlarged scale.

Figure 5 is a sectional transverse elevation taken on line 5—5, Fig. 3;

Figure 6 is a fragmentary view of the front portion of the chuck showing an octagonal instrument handle held with an edge held in alinement with the axis of the chuck body; and Figure 7, a similar view showing a round handled instrument held in the chuck.

Similar numerals refer to similar parts in the several views.

Stem 2 is threaded radially into a cylindrical case 3 and fits into the mobile outer arm 4 of a parallelometer. The case 3 has a bore to receive inner portion 5 of thimble 6. An annular groove 7 is turned on the periphery of this thimble portion to receive the detent 8 formed on the lower end of stem 2, and a spring loaded ball 10 bears on the bottom of this groove to provide retaining friction between the case and the thimble. A thimble locking screw 9 engaging in groove 7 is provided to hold the thimble 6 in a definite position where desired. A stop pin 47 is added to the screw head of screw 9 to engage pin 48 on case 3 and prevent inadvertent removal of the screw 9.

The thimble 6 has a bore 11 to receive the gripping nose piece 12 with a free running fit. An annular collar or lip 14 is formed around the rim of bore 11 and is grooved at diametrically opposite positions to form two sets of positioning grooves or V notches 13 and 43 adapted to bed the flat faces of octagonal instrument handles in different rotational positions. The angle between the instrument bedding faces of the first pair of notches 13 (Figures 2 and 7) being different from the angle between the instrument bedding faces of the second pair of notches 43, Figure 6, the outer surface of this lip may be knurled, if desired, to aid in turning it. Circumferentially beyond lip 14 the outer end of thimble 6 has a conically formed face 15 which extends to the peripheral forward edge of the case 3. A scale 16 is marked on this surface portion of the thimble and a scale reference mark 17 is impressed on the forward face of the case rim. This mark is alined with the axis of stem 2.

Nose piece 12 has a diametrically extending hole 20 drilled thru its outer end portion. This is large enough to receive standard instrument handles. It has a threaded axial hole at its inner end adapted to receive tightening screw 21 operated by knurled head 22.

A diaphragm of thin spring metal 23 closes the inner (right hand) end of case 3. It is set in an annular inner groove in the case end and the material rolled over to form a retaining bead 24. The center of this diaphragm is pierced to receive screw 21, and this in turn is secured against the boss 26 on head 22 by C spring 27 set in an annular groove on said screw shank.

While nose piece 12 is free to turn and slide in thimble 6 it is nevertheless detained by spring loaded ball 30 which provides a frictional resistance in all positions, and a yieldable definite detention in two positions by engagement in longitudinal grooves 31 and 32 on the inner surface of thimble bore 11.

A spring wire finger 33 is secured to the outer face of nose piece 12 by a screw 34. The diametrically extending portion of this finger rests in a groove extending across the nose face, and the engaging tip 35 rests in a longitudinal groove formed in its outer circumference. The finger tip 35 forms a resilient or yieldable detent adapted to engage a groove formed along the outer surface of any round handled instrument 36 and thereby position it axially in hole 20.

In use the stem 2 is held in a parallelometer arm 4.

Thimble 6 is set in a definite rotative position by reading scale 16 by reference to mark 17. It may then be locked by tightening thimble locking screw 9. An instrument 40 having an octagonal handle may then be inserted thru hole 20 in nose piece 12. The nose piece can be readily positioned rotatively to aline the instrument with either set of positioning grooves 13 or 43 by the engagement of ball 30 in correspondingly positioned grooves 31 or 32. The instrument may be set in grooves 13 or 43 depending on whether it is desired to hold the instrument with an edge or a flat alined with the axis of the chuck case. This, in turn, is determined by the plane of the instrument edge 42 which is to be sharpened on stone 48 positioned on the parallelometer base. With the instrument inserted a convenient distance along its handle, tightening screw 21 is turned by head 22. This draws nose piece 12 toward the rim 14 on thimble 6 and draws the outer surface of hole 20 against the outer portion of the instrument handle while the flat faces of the handle engage the sides of positioning notches 13 or 43. If the finger 35 contacts a portion of the handle it springs outward since it is inoperative on all but grooved handled instruments.

Figure 6 shows the application of the chuck to an octagonal handled instrument 45 held with an angular edge of its flats in alinement with the axis of the chuck body 3, and Figure 7 shows a rounded handled instrument 46 having a groove 47 engaged by finger 35 while it is chucked.

Indicia $x$ on the instrument handle may be used to indicate the correct rotative position of the instrument in the chuck as well as the angular position of the handle relative to the axis of stem 2 (and the face of stone 48) as registered on scale 16 relative to reference mark 17.

From the foregoing it will be seen that I have provided a chuck which will hold instruments having octagonal handled instruments with either an edge or a flat at right angles to the axis of the chuck body and therefore in definite relation to the parallelometer arm movement over its base. Hexagonal handled instruments can be similarly held as well as properly constructed round handled instruments.

The nose piece resiliently but firmly draws the instrument into the V notches of the nose piece, this prevents loosening during operation. In setting up the chuck for operation it is noted that the very important factor of rotatively positioning the instrument handle is definitely attained. Instruments having their ground edges correlated to handle positions can therefore be accurately ground by reference to handle indicia or manufacturers data, and without the need of visual inspection of the cutting edge on the stone. The thimble having V notches provides a rigid stable bedding for various types of handles, and can readily accommodate the same instrument in several predetermined settings.

The frictional rotative retention of the thimble in the case aids in holding the setting of the chuck desired for a particular instrument, and the detention of the clamping nose piece with the instrument hole alined with any one of several sets of collar notches greatly aids in correctly clamping instruments in the correct notches.

Having now fully described my invention and explained its use I wish to be limited only by the following claims.

I claim:

1. A parallelometer chuck for holding dental instruments for sharpening comprising, in combination, a cylindrical case having a tightening screw supported in a resilient diaphragm retained in one end thereof, a thimble rotatively operative therein, having diametrically positioned notches at its outer end adapted to position dental instrument handles and bored to axially receive a nose piece, a nose piece operative in said thimble having a transverse instrument receiving opening at its outer end and a threaded hole engaging said tightening screw at its inner end, indicia markings for indicating the rotative position of said thimble relative to said case and a supporting stem radially extending from and attached to said case.

2. In a dental instrument sharpener the combination of a parallelometer having a horizontally positioned sharpening stone, with a flat abrasive surface, and a mobile arm, with a chuck for holding dental instruments having handles, said chuck including, a cylindrical case having a resilient diaphragm closing one end, a tightening screw retained in and operative therethru and indicia marked on the edge of its outer end, a thimble rotatively retained and frictionally restrained in said case having an annular rim at its outer end diametrically notched to bed the sides of handles of dental instruments, bored to receive a nose piece, and having circumferential indicia on its outer face, a radially extending supporting stem attached to said case adapted for attachment to the mobile arm of said parallelometer, and a nose piece operative in said thimble having yieldable rotative positioning means therein, a transverse hole near its outer end adapted to receive dental instrument handles and an axial threaded hole in its inner end to receive said tightening screw.

3. A parallelometer chuck for holding dental instruments comprising, in combination, a cylindrical case closed at one end by a resilient centrally perforated diaphragm and having the rim of the open end beveled and provided with a scale reference mark, and a nose tightening screw retained in said diaphragm; a thimble journaled in said case provided with an annular retaining groove, a conically shaped outer face bearing an annular scale, and an axial bore longitudinally grooved at predetermined annular positions, a rim surrounding the outer end of said bore provided with sets of diametrically positioned V notches adapted to bed the sides of instrument handles of polygonal section either on adjacent flats or flats separated by an intervening flat; a supporting stem threaded into the periphery of said case having a detent on its lower end engaging the sides of the retaining groove in said thimble, and a spring loaded friction ball operative in its end face adapted to bear in the bottom of said groove; and a nose piece rotatively and longitudinally operative in said thimble having a peripheral spring loaded friction ball adapted for yieldable engagement in the longitudinal grooves in said thimble, a transverse hole at its outer end adapted to receive instrument handles, an axial threaded hole in its inner portion adapted to receive said nose tightening screw, and a spring finger secured to its outer face extending diametrically thereacross and bent downward in alinement with the center of said instrument receiving hole to engage connecting grooves in instrument handles inserted therein.

4. A chuck for holding dental instruments, comprising in combination, a cylindrical case having a closed end and an axially positioned tightening screw retained therein, a thimble retained and rotatively operative therein having diametrically positioned V notches in an integral collar rim thereon adapted to support the flats of polygonal handled instruments; a clamping element axially operative in said thimble, cooperative with said tightening screw, and having a transverse opening in its outer end adapted to receive an instrument handle and yieldable rotative positioning means between said clamping element and said thimble; rotative position indicating means intermediate said thimble and said case; a set screw in said case operative on said thimble; and a supporting stem attached to said case and extending radially therefrom.

5. In a parallelometer chuck for holding dental instruments, having handles, in desired axial and angular positions, in combination, a cylindrical case having an axial bore, a vertical supporting stem extending radially from said case; a thimble operative in the axial bore of said case, having an axial bore, and a collar formed around the front end thereof; a gripping nose piece operative within the axial bore of said thimble having a transverse instrument holding hole at its outer end adjacent said thimble collar; a first pair of diametrically positioned instrument handle bedding notches formed in said collar and having angularly disposed instrument bedding faces, a second pair of diametrically positioned instrument handle bedding notches formed in said collar and having angularly disposed instrument bedding faces, the second pair of notches being positioned at right angles to the first pair of notches, and the angle between the instrument bedding faces of the first pair of notches being different from the angle between the instrument bedding faces of the second pair of notches; and yieldable detaining means for positioning either of said pairs of notches in predetermined relation to said stem, including longitudinal grooves formed in the inner face of said thimble bore, and a spring loaded ball operative on the periphery of said nose piece engageable in either of said grooves.

6. In a parallelometer chuck, for holding the handle of a dental instrument, having a longitudinal positioning groove, a chuck including a stem, a cylindrical body, a thimble rotatively operative therein having an annular collar at one end provided with a pair of diametrically positioned instrument bedding notches; means for determining and holding said thimble in said case at desired rotative positions; a gripping nose piece operative in said thimble having a diametrically extending instrument receiving hole at its outer end and screw means for drawing it toward the outer end of said thimble; and a finger attached to the outer end of said nose piece having a resilient portion extending diametrically there across, parallel to said instrument receiving hole with an inwardly turned tip positioned to engage a positioning groove in an instrument retained in said nose piece hole.

JOHN A. LENTZ.

REFERENCES CITED

The following references are of record in the file of this patent:

UNITED STATES PATENTS

| Number | Name | Date |
|---|---|---|
| 1,221,556 | McEachron | Apr. 3, 1917 |
| 1,350,951 | Artmaier | Aug. 24, 1920 |
| 1,385,519 | Calhoun | July 26, 1921 |
| 1,411,713 | Downing | Apr. 4, 1922 |
| 1,546,667 | Lentz | July 21, 1925 |
| 2,165,929 | Lentz | July 11, 1939 |
| 2,380,988 | Mudler | Aug. 7, 1945 |